July 20, 1965 C. D. CHRISTIE 3,195,371
VEHICLE AXLE MECHANISM
Original Filed Nov. 16, 1960
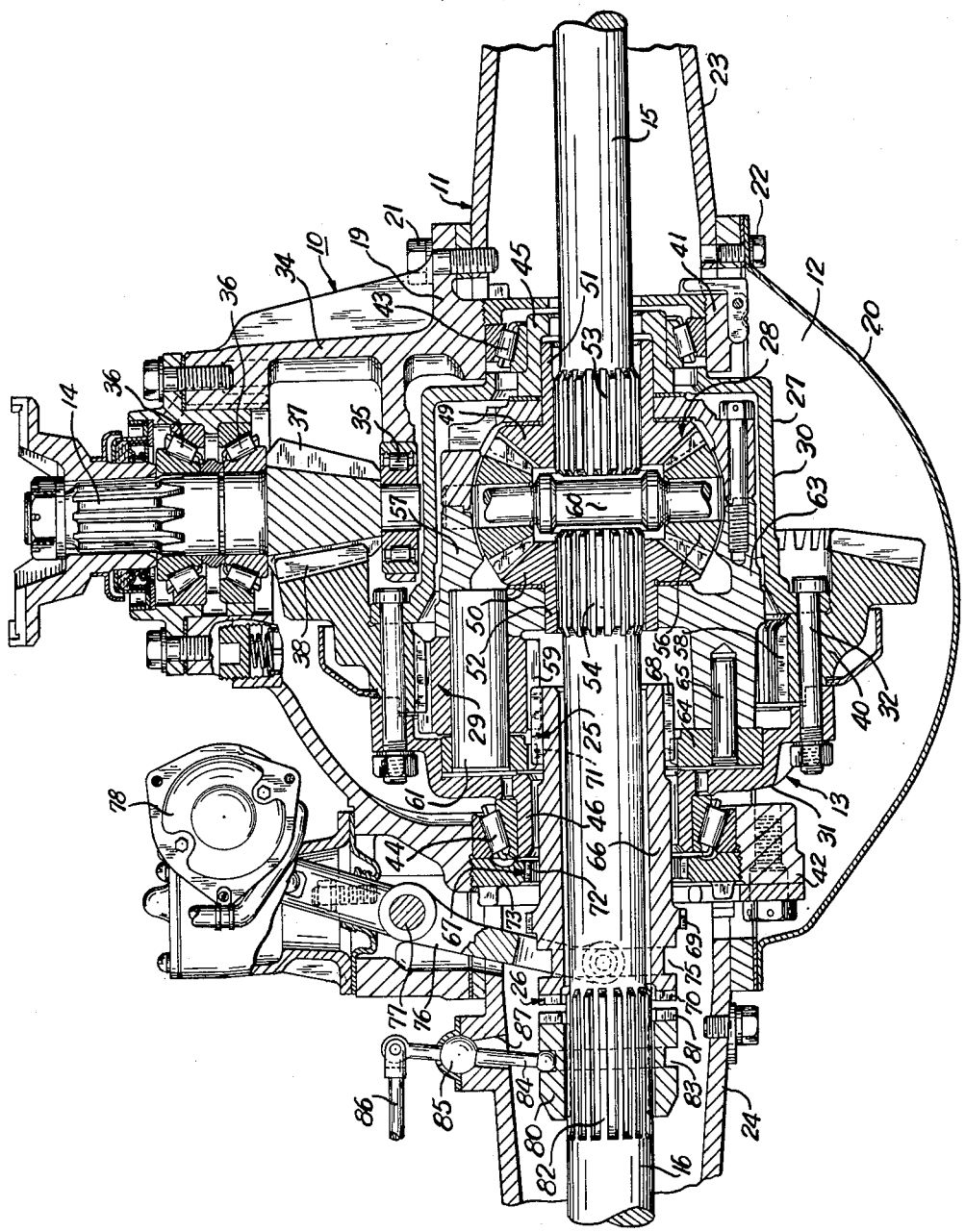
INVENTOR.
CHESTER D. CHRISTIE
BY Hudson, Boughton,
Williams, David & Hoffmann
ATTORNEYS

3,195,371
VEHICLE AXLE MECHANISM

Chester D. Christie, Shaker Heights, Ohio, assignor to Eaton Manufacturing Company, Cleveland, Ohio, a corporation of Ohio
Continuation of application Ser. No. 69,715, Nov. 16, 1960. This application Sept. 21, 1961, Ser. No. 140,971
11 Claims. (Cl. 74—695)

This invention relates to a vehicle axle mechanism of the change-speed type having axle shaft means comprising a pair of axle shafts connected by differential gearing and, as one of its objects, aims to provide a novel construction for an axle mechanism of this type wherein the differential gearing can be selectively locked or unlocked as may be desired by the driver of the vehicle.

This application is a continuation of application Serial No. 69,715, filed November 16, 1960 and now abandoned.

The axle mechanism of this invention is especially suitable for trucks and other heavy vehicles and contributes to safer operation and more satisfactory wheel traction for such vehicles on icy pavements or muddy roads by reducing or preventing slippage of the driving wheels when the differential gearing has been locked out by the driver.

Another object is to provide a novel axle mechanism of the character above indicated and having change-speed gearing of the planetary type which includes a reaction means selectively shiftable to different control positions, and wherein a clutch means is co-operably effective between the reaction means and the axle shaft means for producing the locked-out condition of the differential gearing.

A further object is to provide a novel two-speed axle mechanism of the character referred to above wherein the control positions of the reaction means comprise rotatable and non-rotatable settings thereof, and wherein clutch means operable to connect one of the axle shafts with the reaction means when the latter is in its rotatable seting produces the locked-out condition of the differential gearing.

Still another object is to provide such a novel two-speed axle mechanism wherein the shiftable reaction means comprises a sun gear means whose rotatable and non-rotatable control settings correspond with high-speed and low-speed power transmitting conditions of the planetary gearing, and wherein clutch means operable to connect one of the axle shafts with the sun gear means when the latter is in its rotatable control setting comprises a clutch member connected with, and shiftable along, such one axle shaft to a clutch-engaged position relative to the sun gear means for producing the locked-out condition of the differential gearing.

Additionally, this invention provides novel axle mechanism of the character mentioned in the paragraph next above and having means for preventing actuation of the clutch member to a clutch-engaged position relative to the sun gear means when the latter is in its nonrotatable control setting.

Other novel characteristics, objects and advantages of this invention will be apparent in the following detailed description and in the accompanying drawing which forms a part of this specification and in which the single view presented is a horizontal section taken through the gear-housing portion and gearing of an axle mechanism embodying this invention.

As a preferred embodiment of this invention, the accompanying drawing shows a change-speed vehicle axle mechanism 10 comprising an axle housing 11 containing a gear chamber 12, and a gear unit 13 located in such chamber. The axle mechanism 10 also comprises a rotatable power input means, in this case a power input shaft 14 operably connected with the gear unit 13, and power output axle shaft means connected with the gear unit and comprising laterally oppositely extending axle shafts 15 and 16 for supplying driving torque to a pair of traction wheels.

The housing 11 has front and rear cover members 19 and 20 connected therewith, as by screws 21 and 22, and includes tubular portions 23 and 24 extending in laterally opposite directions from the gear chamber 12 and in which the axle shafts 15 and 16 are coaxially disposed.

The gear unit 13 comprises a rotatable gear case 27 located in the chamber 12, and gearing comprising differential gearing 28 and change-speed gearing 29 in the gear case in an associated relation. The differential gearing 28 and the change-speed gearing 29 are here shown as both being of the planetary type and will be further described hereinafter. The gear case 27 is formed by connected casing sections 30 and 31 secured together by suitable bolts 32 and of which the section 30 is the differential gear case section having the differential gearing 28 located therein and the section 31 is the change-speed gear case section having the planetary gearing 29 therein.

The front cover member 19 of the axle housing 11 includes a forwardly projecting bearing support portion 34 having a rear antifriction bearing 35 and a pair of front anti-friction bearings 36 mounted therein. The bearings 35 and 36 rotatably support the power input shaft 14 and a power input drive member connected therewith, in this case, a bevel pinion gear 37. The gear unit 13 also includes a main gear, in this case, a bevel gear 38 in mesh with the bevel pinion 37. The main gear 38 extends around the outside of the gear case 27 and includes an annular connecting portion 40 which is clamped between the sections 30 and 31 of the gear case by the bolts 32.

The cover member 34 also includes support ring portions 41 and 42 which extend into the gear chamber 12 and form bearing mounts for antifriction bearings 43 and 44 by which the gear unit 13 is rotatably supported in such chamber. The outer recess of the bearings 43 and 44 are suitably secured in the bearing mounts 41 and 42 and the gear case 27 is provided with oppositely extending hollow support projections 45 and 46 which are received in the inner races of these bearings.

The planetary differential gearing 28 comprises a pair of side gears 49 and 50 having sleeve portions 51 and 52 in which the inner end portions of the axle shafts 15 and 16 are secured by spline connections 53 and 54, and planet pinion gears 56 in meshed engagement with the side gears and rotatably mounted on a planet pinion carrier 57. The planet pinion gears 56 operate to drive the side gears 49 and 50 for the delivery of torque to the traction wheels through the axle shafts 15 and 16 in response to driven rotation of the carrier 57, and also operate to produce a differential action between the axle shafts 15 and 16 in a manner well understood in the vehicle axle art when slippage of one or the other of the traction wheels occurs.

The planetary change-speed gearing 29 comprises a ring gear 58 connected with the driven main gear 38, in this case by being formed on the annular connecting portion 40 of the latter, and planet pinion gears 59 in meshed engagement with the ring gear 58 and rotatably mounted on the carrier 57. The carrier 57 is thus common to the differential gearing 28 and to the change-speed gearing 29 inasmuch as both sets of planet pinion gears 56 and 59 are rotatably mounted thereon. The planet pinion gears 56 are here shown as being rotatably mounted on the carrier 57 by a transversely extending shaft 60 having its outer ends received in portions of the carrier, and the planet pinion gears 59 are here shown as being rotatably mounted on the carrier 57 by axially extending pinion shafts 61.

The carrier 57 includes a hollow body section 63 in which the differential gearing 28 is located and a ring section 64 which is connected with the body section, as by dowel pins 65 or the like. The carrier 57 is supported for rotation in the chamber of the gear case 30 by having the body portion 63 journaled on the projections 51 and 52 of the side gears 49 and 50, and also by having the periphery of the ring section 64 slidably mounted in a recess of the gear case section 31. The planet pinion shafts 61 have their ends mounted in the body and ring sections 63 and 64 of the carrier 57 and, in addition to forming pivot shafts for the planet pinion gears 59, they also serve to connect the body and ring sections of the carrier.

The gear unit 13 also includes a control sleeve 66 located in surrounding relation to the axle shaft means of the mechanism, in this case, in surrounding relation to the axle shaft 16 and shiftable along the latter. The sleeve 66 forms a reaction means for the planetary change-speed gearing 29 and also forms clutch parts of a pair of first and second clutch devices 25 and 26, as well as a part of a holding means 67. The clutch devices 25 and 26 and the holding means 67 will be further described hereinafter.

To enable the sleeve 66 to function as a reaction means for the planetary gearing 29 it is provided at the inner end thereof with sun gear means 68 which is continuously in mesh with the planet pinion gears 59. The sleeve 66 is also provided with annular groups of teeth 69 and 70 of which the teeth 69 form a part of the holding means 67 and the teeth 70 form a part of the second clutch device 26.

The first clutch device is also formed in part by the sun gear 68 and in part by a ring gear 71 comprising an annular group of teeth formed on the ring section 64 of the carrier 57. The holding means 67 is formed in part by the teeth 69 of the sleeve 66, as mentioned above, and in part by an annular group of stationary teeth 72 provided on the axle housing 11, the latter teeth being in this case formed on a retaining member 73 for the antifriction bearing 44.

As shown in the drawing, the annular groups of teeth 71 and 72 are located at axially spaced points on the axle mechanism, and the annular groups of teeth 69 and 70 are located at axially spaced points on the sleeve 66 adjacent the outer end thereof. The teeth of the sun gear 68 are located on the inner end portion of the sleeve 66 and are of a suitable length extending therealong for producing a coupling or lock-up action between the plant pinion gears 59 and the ring gear 71.

From the construction of the sleeve 66 and the location thereof with respect to the groups of teeth 71 and 72, it will be seen that the sun gear 68 and the teeth 71 constitute co-operable clutch members of the above-mentioned first clutch device 25, and that the groups of teeth 69 and 72 form co-operably engageable holding members of the above-mentioned holding device 67. It will be seen furthermore that the sun gear 68 forms a reaction gear in the planetary gearing 29 when the sleeve 66 has been shifted toward the right to a nonrotatable control setting in which the teeth 69 are in meshed engagement with the teeth 72. The sleeve 66 is shown in the drawing in its rotatable control setting to which it has been shifted by movement toward the left for engaging the sun gear 68 with the clutch teeth 71 and disengaging the teeth 69 from the holding teeth 72.

To provide for such axial shifting of the sleeve 66 between its inner nonrotatable control setting and its outer rotatable control setting, an annular groove 75 formed in the sleeve adjacent its outer end has a shifter lever 76 engaged therein. The shifter lever 76 is swingably supported on the axle housing 11, as by a pivot pin 77, and is actuatable by a power type shifter device 78.

The axle mechanism 10 comprises, as an important part thereof, a lock-out device formed in part by the clutch teeth 70 of the sleeve 66 and by a shiftable clutch member 80 provided with an annular group of clutch teeth 81 for co-operable engagement with the clutch teeth 70. The clutch member 80 is axially shiftable along the axle shaft means, in this case, along the axle shaft 16 and is connected with the latter for rotation therewith as by a spline connection 82. The groups of teeth 70 and 81 form co-operable clutch members located in an axially opposed relation so that axial shifting of the clutch member 80 on the axle shaft 16 in an inward direction therealong will cause movement of the teeth 81 to a clutch-engaged condition relative to the teeth 70, and shifting of the clutch member 80 in the opposite direction will move the same to a clutch-disengaged condition relative to the teeth 70.

The clutch member 80 can be shifted to its clutch-engaged and clutch-disengaged positions by any suitable actuating means and, for this purpose, is here shown as having an annular groove 83 in which a swingable second shifter lever 84 is engaged. The lever 84 is here shown as being swingably mounted on the axle housing 11 by pivot means 85 and is actuatable by the driver of the vehicle, preferably as a manual operation, by which swinging movement is imparted to the lever by suitable linkage 86 connected therewith. A stop means, in this case a portion 87 of the axle housing 11, is engageable by the shift lever 84 for limiting the extent of shifting of the clutch member 80 in the clutch-engaging direction.

From the construction of the vehicle axle mechanism 10 as shown in the drawing and described above, it will now be seen that a two-speed axle mechanism has been provided having its differential gearing 28 connected with its change-speed gearing 29 by the common carrier 57 so that the differential gearing can be driven at different speeds for producing high and low vehicle speeds, depending upon the control setting to which the sleeve 66 has been shifted. It will now also be seen that when the sleeve 66 has been shifted to its rotatable control position in which it is shown in the drawing, the clutch member 80 can be actuated to an engaged-clutch condition with the sleeve 66 for connecting the sleeve with the axle shaft 16 to thereby produce the locked-out condition of the differential gearing 28 in which no differential action can take place between the axle shafts 15 and 16 and relative rotation between the traction wheels of the vehicle, as the result of wheel slippage, will be effectively prevented.

The accomplishment of these functions by the sleeve 66 and the clutch member 80 in the operation of the axle mechanism 10 will now be explained in somewhat greater detail. When the sleeve 66 is shifted to the right to its nonrotatable control position, the sleeve will be held against rotation by the engagement of the teeth 69 with the stationary teeth 72 and the sun gear 68 will then be a reaction gear for the planetary pinions 59 and the input power applied to the main gear 38 will rotate the gear case 27 causing the ring gear 58 to produce a rolling action of the planetary pinions 59 on the sun gear. A driving action will thereby be produced at a reduced speed for the carrier 57 for causing the differential gearing 28 to transmit torque to the axle shafts 15 and 16.

At this time the sun gear 68 is disengaged from the clutch teeth 71 of the carrier 57 to permit free rotation of the latter, and the clutch teeth 70 of the sleeve 66 are then spaced inwardly from the clutch member 80 so as to lie beyond the range of actuating movement of this clutch member. Since the extent of actuating movement of the clutch member 80 under these conditions is limited by the stop means 87 and thereby prevented from assuming a clutch-engaged condition relative to the sleeve 66, it will not be possible for the vehicle driver to connect the axle shaft 16 with the sleeve 66 when the latter is in its nonrotatable control setting.

During the operation of the axle mechanism 10 under these conditions the speed of the axle shafts 15 and 16 will be a low speed and, at this time, the differential gearing 28 will be fully effective for producing a differential action between the axle shafts, as is desirable during such low speed operation to permit relative rotation between the traction wheels to enable the vehicle to operate properly in turning corners or under certain other conditions such as during travel on a muddy road.

On the other hand, when the sleeve 66 has been shifted outwardly to its rotatable setting shown in the drawing, the sun gear 68 moves into mesh with the clutch teeth 71 of the carrier 57 while still remaining in mesh with the teeth of the planet pinion gears 59. This produces a locked-up condition of the planetary change-speed gearing 29 so that the power input supplied to the differential gearing 28 through the change-speed gearing will then be a high-speed power input. Since the teeth 69 of the sleeve 66 will now have been disengaged from the holding teeth 72, the sleeve will be rotatable with the carrier 57 and the clutch teeth 70 of the sleeve will lie within the range of actuating movement of the clutch member 80.

Whenever the vehicle approaches a slippery portion of the road while the axle mechanism 10 is operating in this high speed condition, the driver can actuate the clutch member 80 to engage the teeth 81 with the teeth 70 to thereby connect the sleeve with the axle shaft 16. The actuation of the clutch member 80 to this clutch-engaged condition is effective on the gear unit 13 through the sleeve 66 to prevent any relative rotation between the carrier 57 and the axle shaft 16, and consequently, the differential mechanism 28 will be in a locked-out condition for safe movement of the vehicle across the slippery road portion. After the vehicle has traversed the slippery road portion, the driver can disengage the clutch member 80 whereupon the gear unit 13 will operate in its high-speed condition with the differential mechanism 28 fully effective to produce any needed differential action between the axle shafts 15 and 16.

From the accompanying drawing and the foregoing detailed description it will accordingly be seen that this invention has provided novel vehcile axle mechanism of the change-speed type in which a selective lock-out action for the differential gearing thereof is achieved in a safe manner for vehicle operation and in a convenient manner for the vehicle operator. Moreover it will be seen that the novel axle mechanism 10 accomplishes the important advantages hereinabove described in an efficient and reliable manner and achieves the same by a construction which is highly practical and which requires only a small number of additional parts over and above the number of parts heretofore needed in an axle mechanism of the change-speed type.

Although the axle mechanism of this invention has been illustrated and described herein to a somewhat detailed extent it will be understood, of course, that the invention is not to be regarded as being correspondingly limited in scope but includes all changes and modifications coming within the terms of the claims hereof.

Having described my invention, I claim:

1. In a drive axle, a pair of axle shafts, a gear unit comprising differential gear means connected with said shafts, change-speed planetary gear means connected with said gear unit to drive the same at different selected speeds including a control gear having a clutch portion and being shiftable along one of said shafts to different control settings for said different selected speeds, clutch means connected with said one shaft for rotation therewith and shiftable therealong into engagement with said clutch portion for producing lock-out of said differential gear means, an actuating lever connected with said clutch means and movable to effect movement thereof along said one shaft, and stop means positioned to engage said actuating lever upon predetermined movement of said clutch means to limit the shifting of said clutch means on said one shaft to prevent said differential lock-out when said control gear is in one of its control settings.

2. In a drive axle, a pair of axle shafts, a gear unit comprising differential gear means connected with said shafts, change-speed planetary gear means connected with said gear unit to drive the same at different selected speeds including a control gear having a clutch portion and being shiftable along one of said shafts to rotatable and nonrotatable control settings for said different selected speeds, clutch means connected with said one shaft for rotation therewith and shiftable therealong into engagement with said clutch portion for producing lock-out of said differential gear means, actuating means effective on said clutch means for shifting the same into engagement with said clutch portion when said control gear is in its rotatable setting, and preventer means associated with said actuating means for preventing engagement of said clutch means with said clutch portion when said control gear is in its nonrotatable setting.

3. In drive axle mechanism having gear housing means; a pair of axle shafts having a common rotation axis and extending into said housing means from opposite sides thereof; a gear unit rotatable in said housing means comprising differential gear means connected with said shafts; change-speed planetary gear means in said housing means and operably connected with said unit to drive the same at different selected speeds; said planetary gear means comprising a ring gear, a carrier rotatable on said common axis, and planet pinion gears on said carrier and meshed with said ring gear; sleeve means surrounding one of said shafts and axially shiftable therealong between rotatable and nonrotatable settings; reaction gear means on said sleeve means and movable to high-speed and low-speed cooperative positions relative to said planetary gear means by the shifting of said sleeve means to its rotatable and nonrotatable settings; means on said housing for preventing rotation of said sleeve means when said reaction gear means is in its low-speed cooperative position; a clutch portion on said sleeve means; a clutch member rotatable with and shiftable along said one shaft; a first actuating means for shifting said sleeve means to its rotatable and nonrotatable settings; a second actuating means for shifting said clutch member into engagement with said clutch portion when said sleeve means is in its rotatable setting only for producing lock-out of said differential gear means including an actuating lever connected with said clutch member and movable to effect movement thereof along said one shaft, and stop means positioned to engage said lever upon predetermined movement of said clutch member to limit the shifting of said clutch member on said one shaft to prevent said differential lock-out when said sleeve means is in its nonrotatable setting.

4. In vehicle axle mechanism having gear housing means, a rotatable power input means, rotatable power output shaft means comprising a pair of axle shafts, differential gear means in said housing means including a rotatable planet carrier and at least one planetary gear rotatably mounted thereon and operatively connected with said pair of shafts to drive the same and to provide a differential action therebetween, change-speed gear means interconnecting said input means and said carrier for driving the latter at various gear ratios, said change-speed gear means including at least one planetary gear rotatably mounted on said planet carrier and reaction means on one of said axle shafts continuously in engagement with the last-mentioned planetary gear and selectively shiftable along said one shaft to rotatable and nonrotatable control settings, clutch means along said one shaft co-operably effective between said one shaft and said reaction means for connecting the same to prevent said differential action when said reaction means is in said rotatable control setting means for moving said clutch means axially along said one shaft into an engaged relation with said reaction means, and means for moving said reaction means axially between its rotatable and nonrotatable control settings independently of axial movement of said clutch means.

5. In drive axle mechanism having gear housing means; a pair of axle shafts having a common rotation axis and extending into said housing means from opposite sides thereof; a gear unit rotatable in said housing means comprising differential gear means connected with said shafts; change-speed planetary gear means in said housing means and operably connected with said unit to drive the same at different selected speeds; said planetary gear means comprising a ring gear, a carrier rotatable on said common axis, and planet pinion gears on said carrier and meshed with said ring gear; sleeve means surrounding one of said shafts and axially shiftable therealong between rotatable and nonrotatable settings; reaction gear means on said sleeve means and movable to high-speed and low-speed co-operative positions relative to said planetary gear means by the shifting of said sleeve means to its rotatable and non-rotatable settings; means on said housing for preventing rotation of said sleeve means when said reaction gear means is in its low-speed co-operative position; a clutch portion on said sleeve means; a clutch member rotatable with and shiftable along said one shaft; a first actuating means for shifting said sleeve means to its rotatable and nonrotatable settings; and a second actuating means for shifting said clutch member into engagement with said clutch portion when said sleeve means is in its rotatable setting for producing lock-out of said differential gear means; preventer means co-operable with said second actuating means for preventing shifting of said clutch member into engagement with said clutch portion when said sleeve means is in its nonrotatable setting.

6. In vehicle axle mechanism; a housing means; planetary differential gearing in said housing means including first planet gear means; planetary change-speed gearing in said housing means including second planet gear means; carrier means common to said differential gearing and said change-speed gearing and having said first and second planet gear means rotatably mounted thereon; rotatable power input means connected with said differential gearing through said change-speed gearing for driving the differential gearing at different speeds; rotatable axle shafts; and differential gearing being connected with said shafts for driving the same and providing a differential action therebetween; sleeve means disposed around one of said axle shafts and shiftable therealong to first and second rotatable and nonrotatable control positions; sun gear means on said sleeve means in meshed engagement with said second planet gear means; holding means effective on said sleeve means in response to shifting of the latter to said second control position for preventing rotation of said sun gear means; a first clutch means comprising an annular group of clutch teeth on said carrier means; said sun gear means being movable to a clutch-engaged position relative to said first clutch means in response to shifting of said sleeve means to said first control position; the clutch-engaged condition of said sun gear means relative to said first clutch means producing a locked condition between said carrier means and said second planet gear means; and second clutch means comprising a clutch member connected with said one axle shaft for rotation therewith and being shiftable therealong in opposite directions to clutch engaged and clutch-disengaged positions relative to said sleeve means, the location and the extent of shifting movement of said clutch member in relation to said sleeve means provide for shifting of said clutch member to its clutch engaged position only when said sleeve means is in said first control position to prevent said differential action.

7. In vehicle axle mechanism; a housing means; planetary differential gearing in said housing means including first planet gear means; planetary change-speed gearing in said housing means including second planet gear means; carrier means common to said diffierential gearing and said change-speed gearing and having said first and second planet gear means rotatably mounted thereon; rotatable power input means connected with said diffierential gearing through said change-speed gearing for driving the differential gearing at different speeds; rotatable axle shafts; said differential gearing being connected with said shafts for driving the same and providing a differential action therebetween; sleeve means disposed around one of said axle shafts and shiftable therealong to first and second rotatable and nonrotatable control positions; sun gear means on said sleeve means in meshed engagement with said second planet gear means; holding means effective on said sleeve means in response to shifting of the latter to said second control position for preventing rotation of said sun gear means; a first clutch means comprising an annular group of clutch teeth on said carrier means; said sun gear means being movable to a clutch-engaged position relative to said first clutch means in response to shifting of said sleeve means to said first control position; the clutch-engaged condition of said sun gear means relative to said first clutch means producing a locked condition between said carrier means and said planet gear means; and second clutch means comprising a clutch member connected with said one axle shaft for rotation therewith and being shiftable therealong in opposite directions to clutch engaged and clutch disengaged positions relative to said sleeve means; stop means effective to limit the shifting of said clutch member in its clutch-engaging direction relative to said sleeve means to prevent said differential action when said sleeve means is in said first control position.

8. In vehicle axle mechanism having gear housing means, a rotatable power input means, rotatable power output shaft means comprising a pair of axle shafts, differential gear means in said housing means including a rotatable planet carrier and at least one planetary gear rotatably mounted thereon and operatively connected with said pair of shafts to drive the same and to provide a differential action therebetween, change-speed gear means interconnecting said input means and said carrier for driving the latter at various gear ratios, said change-speed gear means including at least one planetary gear rotatably mounted on said planet carrier and reaction means on one of said axle shafts continuously in engagement with the last-mentioned planetary gear and selectively shiftable along said one shaft in a first direction from a first position in which said reaction means is in a rotatable control setting to a second position in which said reaction means is in a non-rotatable control setting and in a second direction opposite to said first direction to said first position from said second position, said reaction means having a clutch portion at one end thereof, and clutch means on said one shaft rotatable therewith and selectively shiftable along said one shaft in a first direction from a first position thereon in which said clutch means is in an engaging relation with said clutch portion of said reaction means when said reaction means is in its said first position to a second position on said one shaft in which said clutch means is in a non-engaging relation with said clutch portion of said reaction means and in a second direction opposite said first direction to said first position to connect said clutch means and said clutch portion of said reaction means to prevent said differential action.

9. In vehicle axle mechanism having gear housing means, a rotatable power input means, rotatable power output shaft means comprising a pair of axle shafts, differential gear means in said housing means including a rotatable planet carrier and at least one planetary gear rotatably mounted thereon and operatively connected with said pair of shafts to drive the same and to provide a differential action therebetween, change-speed gear means interconnecting said input means and said carrier for driving the latter at various gear ratios, said change-speed gear means including at least one planetary gear rotatably mounted on said planet carrier and reaction means on one of said axle shafts continuously in engagement with the last-mentioned planetary gear and having a clutch portion on one end, said reaction means selectively shiftable along said one shaft in a first direction from a first position thereon in which said reaction means is in a rotatable control setting to a second position on said one shaft in which said reaction means is in a nonrotatable control setting and in a second direction opposite said first direction to said first position from said second position, clutch means on said one shaft rotatable therewith and selectively shiftable along said one shaft in said first direction from a first position thereon in which said clutch means is in a non-engaging relation with said reaction means to a second position thereon in which said clutch means is in engaging relation with said clutch portion of said reaction means when the latter is in its said first position to prevent said differential action and in said second direction to said first position from said second position.

10. In vehicle axle mechanism; a housing means; carrier means rotatable in said housing means; a rotatably driven power input member; rotatable power output shaft means comprising a pair of axle shafts; differential gear means on said carrier means and connected with said shaft means for driving the same and providing a differential action between said axle shafts; planetary gear means connected between said input member and said carrier means comprising cooperating planetary components including a ring gear on said input member, planet pinion means on said carrier means and meshed with said ring gear, and a sun gear means; said sun gear means being continuously in mesh with said planet pinion means and shiftable on and along one of said axle shafts in a first direction from a first position in which said sun gear means is rotatable with said carrier means to a second position in which said sun gear means is non-rotatable and in a second direction opposite said first direction to said first position from said second position; said planetary gear means being operable to transmit power to said carrier means in different speeds in accordance with the control settings of said sun gear means; shifter means effective on said sun gear means for shifting the same to said first and second positions; holding means effective on said sun gear means for preventing rotation thereof when it is in said second position, said sun gear having a clutch portion at one end thereof; a first clutch means comprising clutch teeth on said carrier means and engageable by said sun gear means for connecting the carrier means and sun gear means for rotation together when said sun gear means is in its said first position; and other clutch means on said one shaft rotatable therewith and selectively shiftable along said one shaft in said first direction from a first position thereon in which said other clutch means is in non-engaging relation with said clutch portion of said sun gear means to a second position thereon in which said other clutch means is in engaging relation with said clutch portion of said sun gear means when the latter is in its said first position to prevent said differential action and in said second direction to said first position from said second position.

11. In vehicle axle mechanism having gear housing means, a rotatable power input means, rotatable power output shaft means comprising a pair of axle shafts, differential gear means in said housing means including a rotatable planet carrier and at least one planetary gear rotatably mounted thereon and operatively connected with said pair of shafts to drive the same and to provide a differential action therebetween, change-speed gear means interconnecting said input means and said carrier for driving the latter at various gear ratios, said change-speed gear means including at least one planetary gear rotatably mounted on said planet carrier and reaction means continuously in engagement with the last-mentioned planetary gear and selectively shiftable to rotatable and nonrotatable control settings, clutch means cooperably effective between said shaft means and said reaction means for operatively connecting the same to prevent said differential action when said reaction means is in said rotatable control setting, an actuating lever connected with said clutch means and movable to effect movement thereof along said shaft means, and stop means positioned to engage said lever upon predetermined movement of said clutch means to limit the shifting of said clutch means to prevent said differential lockout when said reaction means is in its nonrotatable setting.

References Cited by the Examiner
UNITED STATES PATENTS
2,947,200  8/60  Stump _____ 74—695

DON A. WAITE, *Primary Examiner.*
BROUGHTON G. DURHAM, *Examiner.*